Patented June 24, 1930

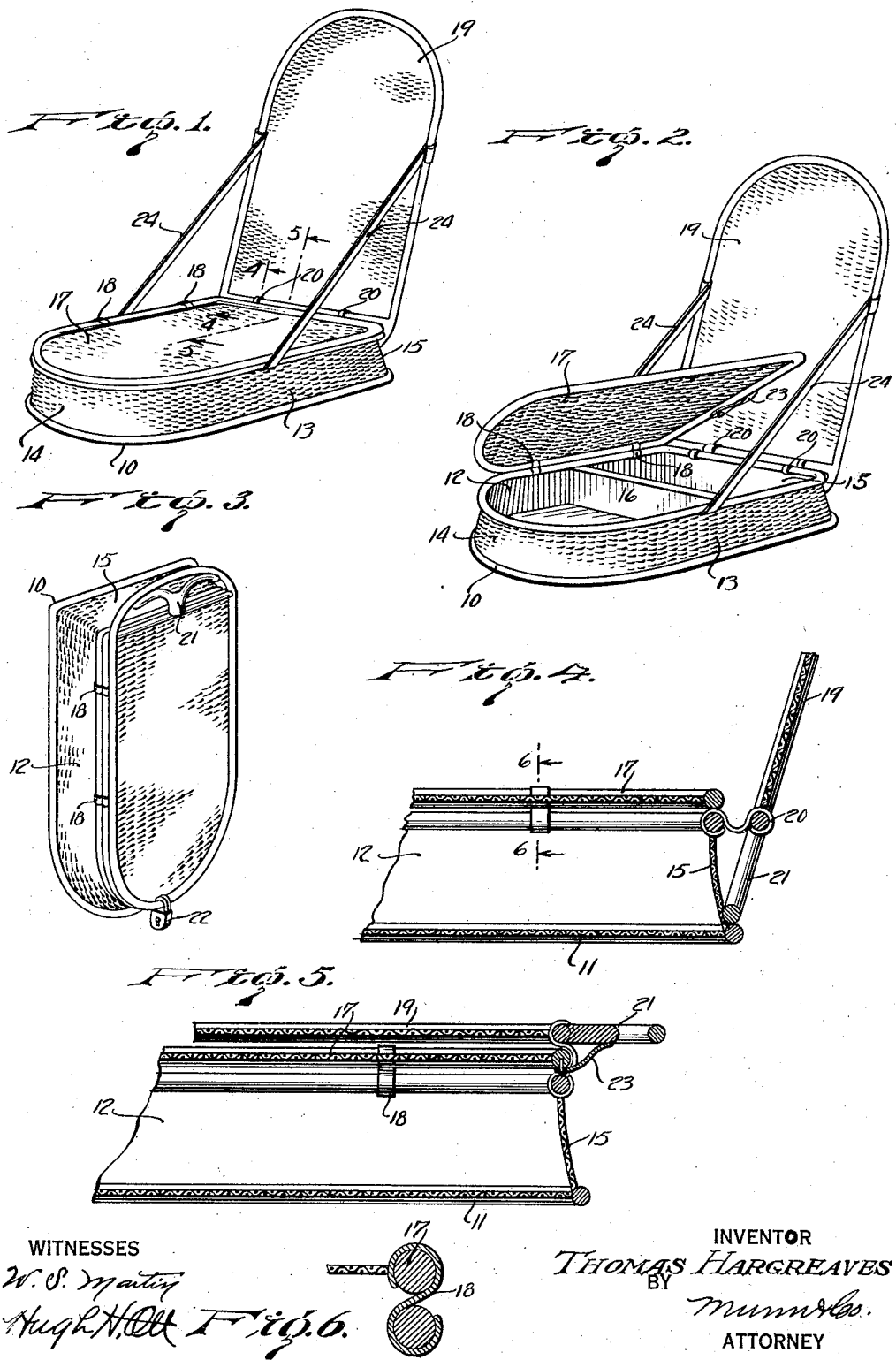

1,767,925

UNITED STATES PATENT OFFICE

THOMAS HARGREAVES, OF HILLSIDE, NEW JERSEY

COMBINED SEAT AND CARRIER

Application filed June 16, 1928. Serial No. 286,014.

This invention relates to combination articles, and has particular reference to a combined portable seat and carrier which is particularly adapted for outing, picnics or the like to constitute means for transporting lunches and various articles and which carrier also serves as a seat.

The invention comprehends a combined seat and carrier which includes a body open at its upper end adapted to receive various articles and including an inner cover and seat member and an outer cover and back member which are respectively pivoted to different edges of the upper open end of the body to overlie each other when the same is closed for carrying.

The invention further comprehends in a device of the character set forth a portion of the outer cover and back rest member which extends outwardly from the pivoted end thereof to constitute respectively a means for limiting the swinging of the member to an open position when serving as a back rest and to afford a handle for carrying the device when the same is closed.

The invention furthermore contemplates a combined portable carrying case and seat which is comparatively simple in its construction and mode of use, which is inexpensive to manufacture and which is highly efficient in its purpose.

With the above recited and other objects in view, reference is had to the following description and accompanying drawings, in which there is exhibited one example or embodiment of the invention, while the claims define the actual scope of the same.

In the drawings:

Figure 1 is a perspective view of the device when used as a seat.

Figure 2 is a similar view with the inner cover and seat member opened for the purpose of gaining access to the interior of the body.

Figure 3 is a perspective view of the same in closed carrying position.

Figure 4 is an enlarged fragmentary sectional view taken approximately on the line 4—4 of Figure 1 and illustrating the position of parts when the device is employed as a seat.

Figure 5 is a similar view illustrating the outer cover and back rest member swung to the closed position.

Figure 6 is an enlarged detail sectional view taken approximately on the line 6—6 of Figure 4.

Referring to the drawings by characters of reference, the device includes a body 10 which is open at its upper end and which includes a bottom 11 and marginal side and end walls 12 and 13 and 14 and 15. The body may be subdivided by a partition 16 if desired, which is preferably disposed transversely of its major axis so that the same may act in the capacity of a brace for the combined inner cover and seat member 17 which is hinged at 18 to one edge of the upper open end of the body. The device further includes an outer cover and back rest member 19 which is hinged at 20, preferably to the upper free edge of the rear marginal wall 15 of the body in such a manner as to be swung to a closed position overlying the inner cover and seat member 17. In order to provide means to act as a stop for limiting the swinging of the member 19 to its open position and to also serve in the capacity of a handle for carrying the device, the member 19 is provided with a portion 21 extending beyond its pivoted end. Obviously, when the member 19 is moved to the opened position illustrated, the extending portion 21 engages or abuts with the marginal wall 15, while when the member 19 is swung to a closed position overlying or disposed in parallel relation alongside of the member 17 with the end of the body 15 disposed uppermost, grasping of the extension 21 to serve as a supporting handle will prevent casual opening movement of the elements. If desired, however, a padlock 22 may engage through suitably formed aligned receiving apertures in the forward edges of the members 17 and 19. Obviously, in lieu of a padlock, a suitable retaining element 23 may be pivoted to the rear edge of the member 17 to engage under the projecting portion 21, as illustrated in Figure 5. If desired, auxiliary means for limiting the swinging of the member 19 to open position may be provided in the form of flexible connecting elements 24, the opposite ends of which are respectively connected to the side edges of the member 19 and to the side edges of the body 10.

While the body and cover members are illustrated as constructed of reed or wicker, which is especially suitable for the purpose, no limitation to these materials is intended, as it is obvious that the same may be constructed of any suitable material for the purpose.

What is claimed is:

1. A combined portable carrying case and seat including a body open at its upper end, an inner cover and seat member and an outer cover and back rest member, said members being respectively pivoted to different edges of the upper open end of the body and a portion of said outer cover and back rest member extending outwardly from the pivoted end thereof to constitute means for respectively limiting the swinging of said member to an open position and to serve as a handle for carrying the device when closed.

2. A combined portable seat and carrying case including a body having a bottom and upstanding side and end marginal walls, a combined inner cover and seat member hinged to one of the side marginal walls of the body, a combined outer covering and back member hinged to one of the end marginal walls and adapted to fold over the combined inner cover and seat member and means for limiting the swinging movement of said latter member to an open position, said means including a portion of said member extending beyond the pivoted end thereof and adapted to engage against the marginal wall of the body, said extending portion having an opening through which the hand may be engaged for carrying the device when closed.

3. A combined portable seat and carrying case including a body having a bottom and upstanding side and end marginal walls, a combined inner cover and seat member hinged to one of the side marginal walls of the body, a combined outer covering and back member hinged to one of the end marginal walls and adapted to fold over the combined inner cover and seat member and means for limiting the swinging movement of said latter member to an open position, said means including a portion of said member extending beyond the pivoted end thereof and adapted to engage against the marginal wall of the body, said portion being so located as to serve as a handle for carrying and gravitationally maintaining the device in a closed condition.

THOMAS HARGREAVES.